Sept. 8, 1970                    L. R. ORD                    3,527,470
                                FREIGHT DOLLY
Filed Feb. 13, 1969                                        2 Sheets-Sheet 1

INVENTOR.
LEWIS R. ORD

BY Arne J. Fors

Agent

Sept. 8, 1970   L. R. ORD   3,527,470
FREIGHT DOLLY

Filed Feb. 13, 1969   2 Sheets-Sheet 2

INVENTOR.
LEWIS R. ORD
BY
Arne J. Fors 3,527,470
FREIGHT DOLLY
Lewis R. Ord, 23 Prince George Drive,
Islington, Ontario, Canada
Continuation-in-part of application Ser. No. 676,862,
Oct. 20, 1967. This application Feb. 13, 1969, Ser.
No. 801,926
Claims priority, application Great Britain, Feb. 24, 1967,
9,009/67
Int. Cl. B62b 5/00
U.S. Cl. 280—79.2                           12 Claims

ABSTRACT OF THE DISCLOSURE

The disclosure of this application relates to a novel freight dolly construction particularly suitable for supporting and conveying unit containers. The dolly comprises a load-supporting platform rotatably mounted on a plate by a central swivel, means to lock the platform on the plate, and a plurality of wheels and castors disposed about the axis of the swivel on the underside of the plate.

---

This application is a continuation-in-part of U.S. application Ser. No. 676,862, filed Oct. 20, 1967, now abandoned.

This invention relates to apparatus for the transport of containers and more particularly relates to dollies for conveying unit freight containers.

It is becoming increasingly common to pack freight in a container and transport and deliver the freight in the same container. It is, for example, common to pack a container at a warehouse, mount the container in a truck, transport the container to a quayside where the container is conveyed to the hold of a ship, and transport the container to its eventual destination in its original packed condition. It is also common to transfer a loaded container from a truck to a railway flat-car and likewise transport the container to its final destination with contents remaining in packed form. The advantages of transportation of freight in this manner are many. The cost of loading and unloading freight is greatly reduced; there is less likelihood of pilferage and breakage; and handling time is reduced.

Certain disadvantages offset the above advantages, however. Such containers are bulky, some being as long as forty feet and having load capacities in the order of forty tons. At the time of transfer of such containers from one vehicle to another, or during loading and unloading of such containers, it is frequently necessary to move the containers about a freight yard, warehouse, dock area or the like. It may also be necessary to store such containers for a period of time between unloading from one vehicle and loading onto another. As a result the containers must be moved between the loading area and the place of storage.

In view of the size of the containers, heavy duty equipment is necessary to handle them in loading and unloading operations.

It is also known to provide such containers with lifting means such as hydraulic legs to raise the containers above the ground to permit carrying vehicles to be driven under the containers for loading and unloading. However, the equipment presently used is expensive and the cost of acquiring and maintaining such equipment adds materially to the handling cost of such containers.

It is known to employ a plurality of dollies for supporting and conveying large freight containers. In U.S. Pat. No. 2,314,129 granted to W. E. Daley, for example, a dolly is described having a generally T-shaped frame and a castor positioned at each end of the cross bar of the T and at the end of the stem portion remote from the cross bar. Where one such dolly is positioned at each corner of a container, the container may be moved relatively easily and, may be manoeuvred without difficulty. Such a dolly is said to be relatively cheap and may be stored in a small space when not in use.

Known dollies, and in particular the dolly described in the above patent, have a number of disadvantages. It is well known that in order to obtain a so called castor-action, the centre of the swivel bearing of a castor must be horizontally offset from the wheel axis. As the result of this offset, a bending moment is imposed on the swivel bearing and on the castor fork which is proportional to the weight bearing down on the castor. No such bending moment is imposed on a simple wheel since the load bears directly on its axle. It therefore follows that where a castor and wheel are both capable of bearing the same load the castor must be constructed of material having greater strength than material of which a wheel is constructed. Thus where a castor and wheel have the same load carrying capabilities, the castor will normally be more expensive than the wheel.

An additional disadvantage of dollies which travel on castors alone is that it is difficult to prevent containers carried on such dollies from travelling on the intended path. The containers frequently travel on a zig-zag path and they may collide with other objects. In addition, such dollies provide no simple and convenient means by which the container can be secured thereto and prevented from separating therefrom.

I have discovered a dolly construction which substantially obviates the foregoing problems by having enhanced load-carrying capabilities with the desirable swivel action of a castor, i.e. the assembly functions as a castor unit with the load capacity of a conventional wheel unit which supports vertical loads substantially without the bending moment at the point of attachment inherent in a castor, and which also permits the selective tracking of a fixed wheel unit.

It is accordingly an object of this invention to provide a dolly which is highly manoeuvrable and has the same load-carrying capabilities but is substantially less expensive than dollies which run on castors alone.

It is a further object to provide a dolly having both castors and wheels which provide relatively inexpensive and simple means for conveying large heavy freight containers.

It is a further object to provide dollies for conveying freight containers which can be manufactured cheaply, can be stored in a small space and which permit facile movement and manoeuvrability of containers being conveyed thereon.

These and other objects may be accomplished by providing a dolly including a load supporting platform, a plate, the plate and platform being rotatably interconnected so as to rotate, relative to each other about a vertically disposed turning axis, a castor pivotally secured to the underside of the plate so as to pivot about a vertical axis, and a plurality of substantially parallel wheels, each wheel having an axle and being secured to the underside of the plate, the castor and wheels being disposed about the turning axis such that the turning axis is disposed between the castor axis and an imaginary line joining the wheel axles.

A plurality of dollies is positioned under each container, normally one dolly at each corner of a container and the container can be readily manoeuvred, if desired, by the dollies, each having the swivelling action of a castor provided by the rotation of the swivel connections between the dolly platforms and plates and by the single castor.

Hereinafter, for the sake of clarity a non-castor type wheel will be referred to simply as a "wheel." A castor will be described not as travelling on a wheel but on a roller.

It has been found that manoeuvrability is satisfactory if each dolly on which the container rests has a plurality of wheels and is provided with at least one castor, and manoeuvrability is enhanced by the provision of a load supporting platform rotatably mounted on the dolly plate. The wheels serve to carry part of the load yet do not require sturdy bearings and brackets since no large bending moments are imposed on these components at their points of attachment. Since castors are generally more expensive than non-castor type wheels designed to carry the same load, substantial savings are derived from the use of non-castor type wheels.

In addition, since the plate and platform rotate relative to each other about an axis which is preferably closer to the wheels than the castor, each wheel carries substantially more of the load than a castor. Thus the castor of such a dolly does not require the rugged bearings or brackets required on a castor used on a dolly having no non-castor type wheels. It is evident therefore that the wheels and castor of the dolly according to the invention need not have as sturdy bearings and brackets as the castors of dollies which have no non-castor type wheels, even though the load carrying capabilities of the two dollies are the same. Moreover, the manoeuvrability of the dollies according to the invention is quite satisfactory for normal purposes.

The container need not be attached to the dollies but may rest on the dollies by its own weight. It may, however, be desired to attach the dollies to the under-surface of the container, normally at each corner of the container and, it is preferred to utilize some form of quick action engaging means whereby the dollies may be secured in position without any time-consuming securing or unsecuring operation. Such securing means eliminates the need for careful positioning of the dollies on the ground in the lowering of the container.

The dollies may be provided with locking arrangements whereby selected swivel platform connections and castors may be restrained from rotation. When the container is being towed, preferably the castors and platforms of the rear dollies should be restrained from rotating or swivelling and those at the front permitted to rotate or swivel. Turning of the container is accomplished by swivelling about the free swivel connections, and pivoting about the wheels and castors of the locked swivel connections. The relative positions of the fixed dollies and the articulating points of tow hitches determine the ability of the container to follow the path taken by the towing vehicle and the amount of whip of its path.

The dollies may be provided with numerous other features including braking systems and built-in lubricating systems.

According to a feature of this invention there is provided an apparatus for transporting freight comprising a container and a dolly which has been set forth removably secured to each corner of the container.

Embodiments of this invention will now be described, by way of example only, with reference to the accompanying drawings in which.

Like reference characters refer to like parts throughout the description of the drawings.

Figure 1:
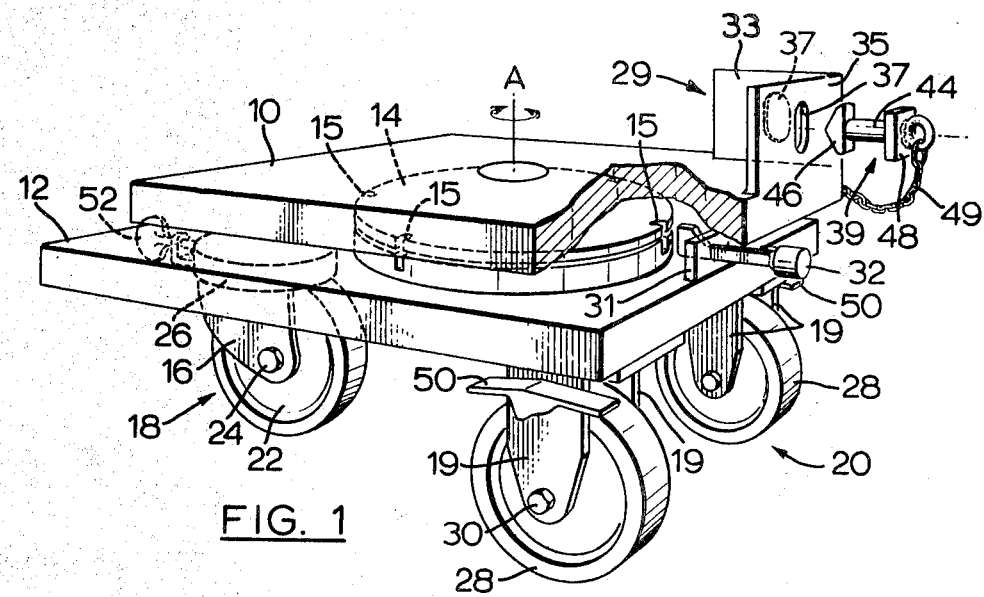
FIG. 1 is a perspective view of a dolly in accordance with the invention.

The dolly shown in FIG. 1 comprises platform 10 rotatably connected to plate 12 by central swivel 14. Downwardly projecting flanges 16 of the fork of castor 18 and brackets 19 of each of the two non-castor type wheels 28 are secured to plate 12 and offset about vertical turning axis A—A about which swivel 14 rotates.

Castor roller 22 is supported on an axle 24 journalled in bearings mounted in forks 16 which are pivotally secured at 26 to the underside of the main plate 12 so as to pivot about a vertical axis. Wheels 28 are journalled parallel to each other for rotation about axles 30 mounted in brackets 19 which are fixed to the underside of plate 12. The horizontal distance between turning axis A—A and an imaginary line joining axles 30, measured along a line normal to the imaginary line, is preferably less than the horizontal distance between turning axis A—A and the vertical axis about which castor 18 pivots. More preferably the distance between axis A—A and the imaginary line is one half the distance between axis A—A and the castor axis.

In addition it is preferred that brackets 19 be equispaced from turning axis A—A. Wheel spacing is however not critical provided axis A—A is located between castor 18 and the imaginary line connecting axles 30.

It has also been found preferable to locate the two wheels and castor on plate 12 such that a horizontal line which extends normally from a point on the imaginary line joining axles 30 and is equidistant from both axles 30 intersects both axis A—A and the castor axis.

The main swivel 14 is provided with a locking device or detent 32, operatively supported by plate projection 31, for preventing undesired rotation of the main swivel 14. Recesses 15 formed in the periphery of swivel 14 permit platform 10 to be locked by device 32 at any desired 90° position such that the corner bracket 29 defined by walls 33, 35 formed in a corner of platform 10 and equispaced from axis A—A will engage any corner of a container. Elongated slots 37 are formed in walls 33, 35 for alignment of one of said slots with a corresponding slot formed in each corner of a conventional container for reception of twist-lock connector generally indicated 39. Connector 39 consists of a head 46 formed at one end of shank 44 for insertion into a slot 37 and corresponding slot in a container corner and for rotation therein for locking egagement of the bracet 29 with the container between head 46 and enlarged connector shank portion of nut 48. Connector 39 can be conveniently secured to bracket 29 by means of chain 49.

A lock 52 can be provided to lock castor 18 from pivoting such that the castor roller 22 is parallel to wheels 28 and wheels can be provided with brakes 50.

Although the foregoing description has proceeded with reference to dollies having two wheels and a castor, it will be understood that the invention is intended to encompass dolly assemblies comprising a load supporting platform rotatably mounted on a plate by means of a main swivel wherein said plate has two castors arranged in side-to-side relationship and a plurality of wheels to increase the load-carrying capacity of the dolly; the axis of the main swivel being located between the castor and the wheels.

Figure 2:
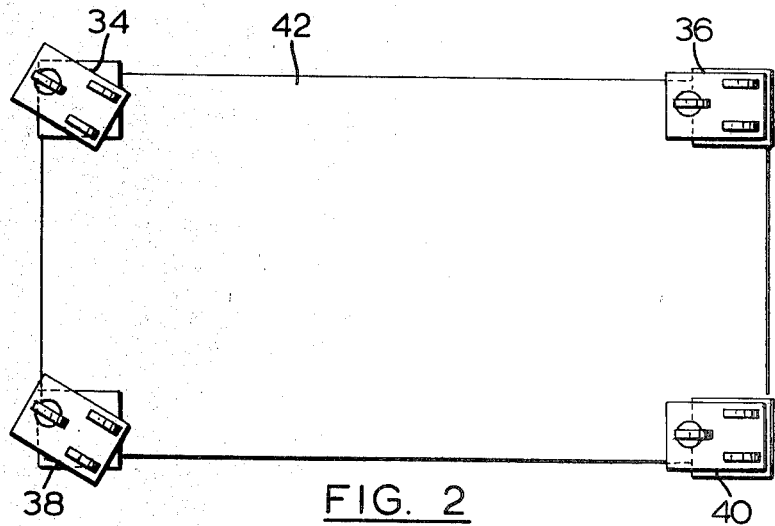
FIG. 2 is a bottom view showing four of the dollies of FIG. 1 disposed in their load supporting positions under the corners of the freight containers.

In FIG. 2, four dollies 34, 36, 38 and 40 of the type shown in FIG. 1 are shown disposed under and connected to each corner of the freight container. Dollies 34 and 38 disposed at the front end of the container 42 have their main swivels 14 and castors 18 (see FIG. 1) free to rotate while the main swivels of dollies 36 and 40 disposed at the rear end of the container 42 have their locking devices 32 in the closed or locked positions and castors 18 locked such that their respective wheels and rollers are aligned in the positions shown in FIG. 2. In this way, the container 42 may be towed from its front end on the dollies with excellent steering control; the front dollies assuming the positions indicated by the broken lines in FIG. 2, as the container is turned. If it is desired to tow the container from its rear end, the main swivels and castors of the dollies 34 and 38 may be locked with the wheels and castors in the positions shown by solid lines in FIG. 2 and the locking devices of the dollies 36 and 40 can be unlocked. If desired, the containers can be moved with the main swivels of all the dollies unlocked or locked in any other desired positions.

Figure 3:
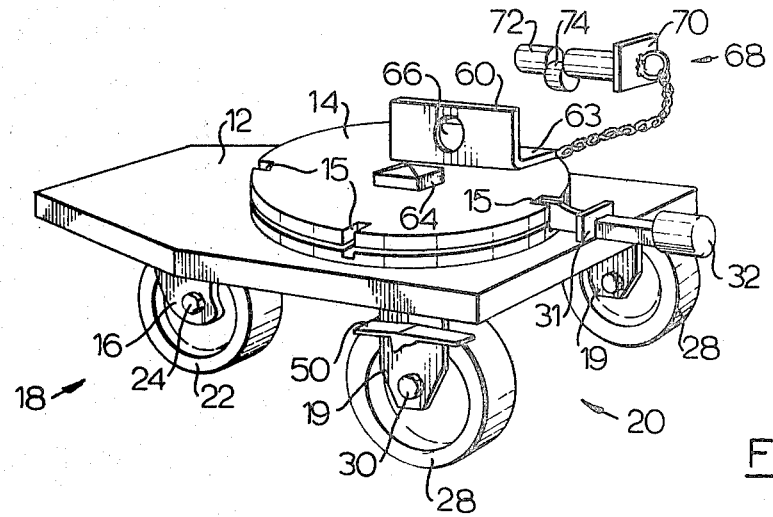
FIG. 3 is a perspective view of a second embodiment of a dolly in accordance with the invention.

With reference to FIG. 3, a second embodiment of the invention is shown. The illustrated dolly has a plate 12 to which swivel 14 is secured. Swivel 14 has an angle section 62 secured thereto by flange 63 whereby swivel 14 functions as a load supporting platform to receive the underside of a freight container and upstanding flange 60 of angle section 62 abuts the side wall of the said container. Flange 60 is spaced a predetermined distance from post 64 formed centrally on swivel 14 equivalent to the spacing of the corresponding rectangular opening formed in the underside of each container at the corner thereof from the container side wall. The sides of post 64 are parallel to the plane of flange 60. Post 64 is shown in cross-section.

Elongated slot 66 formed in flange 60 for coincidence with a corresponding slot formed in each corner of a container is adapted to receive a twist-lock connector 68. Connector 68 consists of nut 70 formed at one end of shank 72 adapted to abut the outside face of flange 60 when shank 72 is inserted into slot 66 and the connector twisted such that cam 74 abuts the inner face of the container wall to lock the dolly to the connector corner.

Figure 4:
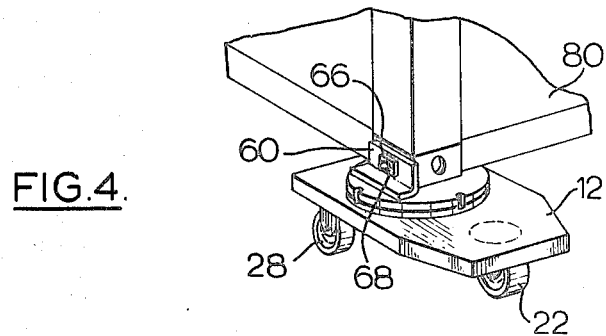
FIG. 4 is a perspective view of the dolly illustrated in FIG. 3 connected to the corner of a container.

With reference to FIG. 4, the dolly illustrated in FIG. 3 is shown connected to and supporting a corner of freight container 80. As shown slot 66 of the dolly coincides with a corresponding slot, not visible, of container 80 and twist-lock connector 68 prevents the container from separating from the dolly.

Figure 5:
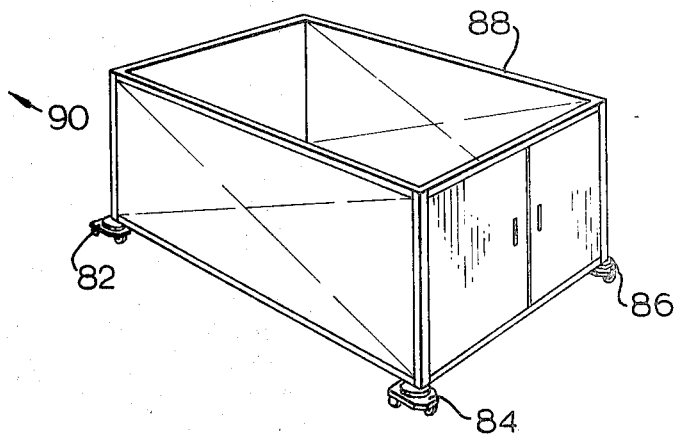
FIG. 5 is a perspective view of a container supported, at each corner by the dolly illustrated in FIG. 3.

With reference to FIG. 5, dollies 82, 84, and 86 of the type shown in FIG. 3 are illustrated disposed under and connected to separate corners of container 88. Where the swivels and castors of dollies 84 and 86 are in locked-parallel positions, container 88 may be towed in the direction of arrow 90 with excellent steering control.

What I claim as new and desire to protect by Letters Patent of the United States is:

1. A dolly including a load-supporting platform, a plate, the plate and platform being rotatably interconnected so as to rotate, relative to each other, about a vertically disposed turning axis, a castor pivotally secured to the underside of the plate so as to pivot about a vertical axis, and a plurality of substantially parallel wheels, each having an axle and being secured to the underside of the plate, the castor and wheels being disposed about the turning axis such that the turning axis is disposed between the castor axis and an imaginary line joining the wheel axles and wherein the horizontal distance between the turning axis and the imaginary line measured along a line normal to the imaginary line is less than the horizontal distance between the turning axis and the castor axis.

2. A dolly as claimed in claim 1 wherein the horizontal distance between the turning axis and the imaginary line measured along a line normal to the imaginary line is one-half the horizontal distance between the turning axis and the castor axis.

3. A dolly as claimed in claim 1 wherein one only castor and two only wheels are secured to the underside of the plate, the wheels being equidistant from the turning axis, the distances being measured along a horizontal line.

4. A dolly as claimed in claim 1 wherein one only castor and two only wheels are secured to the underside of the plate, the castor and wheels being so positioned that a horizontal line extending normally from a point on the imaginary line equidistant from both wheel axles intersects both the turning axis and the castor axis.

5. A dolly as claimed in claim 1 including locking means for locking the platform relative to the plate at intervals of 90° about the axis of the swivel.

6. A dolly as claimed in claim 5 wherein a swivel is interposed between the platform and the plate, the locking means comprising a detent carried by the plate engageable with recesses formed in the swivel.

7. A dolly as claimed in claim 6 including securing means for removably securing the platform to a container.

8. A dolly as claimed in claim 7 wherein the securing means comprises a bracket having a pair of walls perpendicular to each other and equispaced from the turning axis formed on the upper surface of the platform, the bracket walls each having a slot formed therein adapted to receive a securing device.

9. A dolly as claimed in claim 7 wherein the securing means includes an angle section and a post both being secured to the platform, and having opposed surfaces, the post adapted to be received in a corresponding opening formed in the underside of a container resting on the dolly, the opposed surface of the angle section having a slot adapted to coincide with a slot formed in the underside of the container.

10. A dolly as claimed in claim 9 wherein a twist lock connector is adapted to be received in the coinciding slots of the dolly and container and when so received, to prevent separation of the dolly from the container.

11. A dolly as claimed in claim 8 wherein the castor has a roller, the dolly further including means for locking the castor from rotation such that the castor roller is parallel to the wheels.

12. An apparatus for transporting freight comprising a container and a dolly as claimed in claim 11 removably secured to each corner of the container.

References Cited
UNITED STATES PATENTS

| | | | |
|---|---|---|---|
| 1,895,844 | 1/1933 | Contois | 280—79.1 |
| 2,314,129 | 3/1943 | Daley | 280—79.1 |
| 3,433,500 | 3/1969 | Christensen | 280—79.2 |

BENJAMIN HERSH, Primary Examiner

R. R. SONG, Assistant Examiner